United States Patent
Mamikonyan et al.

(10) Patent No.: US 11,281,444 B2
(45) Date of Patent: Mar. 22, 2022

(54) APPLICATION UPDATE MONITORING COMPUTER SYSTEMS

(71) Applicant: Creative Breakthroughs, Inc., Detroit, MI (US)

(72) Inventors: David Mamikonyan, Holland, PA (US); Jason Cordell, Pickerington, OH (US)

(73) Assignees: Creative Breakthrough Inc., Detroit, MI (US); David Mamikonyan, Holland, PA (US)

( * ) Notice: Subject to any disclaimer, the term of this patent is extended or adjusted under 35 U.S.C. 154(b) by 10 days.

(21) Appl. No.: 16/453,644

(22) Filed: Jun. 26, 2019

(65) Prior Publication Data

US 2020/0409679 A1 Dec. 31, 2020

(51) Int. Cl.
*G06F 8/65* (2018.01)
*G06F 9/445* (2018.01)
*G06F 12/0864* (2016.01)
*G06F 16/958* (2019.01)

(52) U.S. Cl.
CPC .............. *G06F 8/65* (2013.01); *G06F 9/4451* (2013.01); *G06F 12/0864* (2013.01); *G06F 16/958* (2019.01)

(58) Field of Classification Search
CPC ...... G06F 8/65; G06F 9/4451; G06F 12/0864; G06F 16/958

USPC .......................................................... 717/170
See application file for complete search history.

(56) References Cited

U.S. PATENT DOCUMENTS

| | | |
|---|---|---|
| 6,314,565 B1 | 11/2001 | Kenner et al. |
| 7,913,246 B2 | 3/2011 | Hammond et al. |
| 9,535,685 B1 | 1/2017 | Wang et al. |
| 2012/0143917 A1* | 6/2012 | Prabaker et al. ....... G06F 16/21 707/784 |
| 2014/0101149 A1* | 4/2014 | Winters et al. ....... G06F 16/958 707/736 |

* cited by examiner

*Primary Examiner* — Wei Y Zhen
*Assistant Examiner* — Mohammed N Huda
(74) *Attorney, Agent, or Firm* — Brooks Kushman P.C.

(57) ABSTRACT

A method for monitoring application updates including accessing a first application server of a first application to obtain first application update data on a first application website. First application data and the first application version update data are structured on the first application website in a first format, a first number of locations, and/or a first webpage hierarchy. The method further includes accessing a second application server of a second application to obtain second application update data on a first application website. Second application data and the second application version update data are structured on the first application website in a second format, a second number of locations, and/or a second webpage hierarchy. At least one of the first format, the first number of locations, and the first webpage hierarchy is different than at least one of the second format, the second number of locations, and the second webpage hierarchy.

20 Claims, 6 Drawing Sheets

APPLICATION UPDATE MONITORING COMPUTER SYSTEMS

TECHNICAL FIELD

Aspects disclosed herein generally relate to application update monitoring computer systems.

BACKGROUND

A distributed computer system of an organization includes user computers configured to be utilized by employees, workers and/or independent contractors to carry out and execute their daily tasks and other job responsibilities. As part of this configuration, each user computer has applications installed thereon that relate to the performance of organization related tasks. Due to the proliferation of application solutions over the years, there are more and more applications installed on user computers and applications installed on user computers permitting users to access cloud-based application solutions. In both instances, organizations are challenged with how to detect, monitor and deploy updated versions of these applications. This challenge expands as the number of applications installed or accessed on user computers increases, and as the number of operating system platforms where the applications are installed increases within an organization.

SUMMARY

In a first embodiment, a computer system for monitoring application updates is disclosed. The computer system includes a computer having non-transitory memory for storing machine instructions that are to be executed by the computer. The machine instructions when executed by the computer implement the following function: access a first application server of a first application to obtain first application update data on a first application website served by the first application server. The first application update data includes first application data and first application version update data. The first application data and the first application version update data are structured on the first application website in a first format, a first number of locations, and/or a first webpage hierarchy. The functions further include: access a second application server of a second application to obtain second application update data on a first application website served by the second application server. The second application update data includes second application data and second application version update data. The second application data and the second application version update data are structured on the first application website in a second format, a second number of locations, and/or a second webpage hierarchy. At least one of the first format, the first number of locations, and the first webpage hierarchy is different than at least one of the second format, the second number of locations, and the second webpage hierarchy. The functions further include: generating a first update database record including the first application update data, the first update database record structured differently than the first format, the first number of locations, and/or the first webpage hierarchy. The functions further include generating a second update database record including the second application update data, the second update database record structured differently than the second format, the second number of locations, and/or the second webpage hierarchy.

In a second embodiment, a computer readable medium is disclosed. The computer readable medium includes a non-transitory memory for storing machine instructions that are to be executed by a computer. The machine instructions when executed by the computer implement the following function: access a first application server of a first application to obtain first application update data on a first application website served by the first application server. The first application update data includes first application data and first application version update data. The first application data and the first application version update data are structured on the first application website in a first format, a first number of locations, and/or a first webpage hierarchy. The functions further include: access a second application server of a second application to obtain second application update data on a first application website served by the second application server. The second application update data includes second application data and second application version update data. The second application data and the second application version update data are structured on the first application website in a second format, a second number of locations, and/or a second webpage hierarchy. At least one of the first format, the first number of locations, and the first webpage hierarchy is different than at least one of the second format, the second number of locations, and the second webpage hierarchy. The functions further include: generating a first update database record including the first application update data, the first update database record structured differently than the first format, the first number of locations, and/or the first webpage hierarchy. The functions further include generating a second update database record including the second application update data, the second update database record structured differently than the second format, the second number of locations, and/or the second webpage hierarchy.

A method for monitoring application updates is disclosed. The method includes accessing a first application server of a first application to obtain first application update data on a first application website served by the first application server. The first application update data includes first application data and first application version update data. The first application data and the first application version update data are structured on the first application website in a first format, a first number of locations, and/or a first webpage hierarchy. The method further includes accessing a second application server of a second application to obtain second application update data on a first application website served by the second application server. The second application update data includes second application data and second application version update data. The second application data and the second application version update data are structured on the first application website in a second format, a second number of locations, and/or a second webpage hierarchy. At least one of the first format, the first number of locations, and the first webpage hierarchy is different than at least one of the second format, the second number of locations, and the second webpage hierarchy. The method further includes generating a first update database record including the first application update data, the first update database record structured differently than the first format, the first number of locations, and/or the first webpage hierarchy. The method also includes generating a second update database record including the second application update data, the second update database record structured differently than the second format, the second number of locations, and/or the second webpage hierarchy.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Organizations install a wide variety of applications on their user computers so that the individuals using these computers can perform their daily tasks and other job responsibilities. Often times these applications must be updated or patched with new versions so that they continue to operate in their intended manner or expand on the functionality of the applications. Identifying new versions of applications is sometimes problematic for organizations because the software tools do not exist to automatically and seamlessly identify updates on a broad range of applications. While some endpoint management tools identify new versions for a relatively small number of applications, these software tools only present a limited solution to the challenge of update detection and monitoring. What is needed is an application update monitoring computer system that generates update database records using programs customized for each of a wide range of applications, platforms and operating systems that are configured to obtain update data from an unordered source (e.g., multiple webpages of a website) and generate an ordered database record from the unordered data sources.

In one or more embodiments, the present disclosure relates to an application update monitoring computer system that overcomes one or more of the issues identified herein by utilizing programs customized for each of a wide range of applications, platforms and operating systems. In one embodiment, the application update monitoring computer system includes an update monitoring program customized for a specific application to determine the existence of an updated version and to automatically pull new version metadata from an Internet source and create an update database record to facilitate updating of the application. The existing software update systems fail to provide this functionality, and thereby do not offer the technical solutions of the one or more embodiments of the present disclosure.

While one or more embodiments of the present disclosure are directed to generating update database records, U.S. Pat. No. 9,535,685 discloses a computerized technique for using a software version database, which exists for a relatively small number of applications. The computerized technique includes receiving an electronic communication containing a software version database which identifies different versions of a software application. In order for the system to work, the system periodically receives a catalogue file from a catalogue file server, or acquires a catalogue file in response to sending a request to a catalogue file server. The system does not generate or create update database records for any applications, much less a broad range of applications.

U.S. Pat. No. 6,314,565 discloses a system and method for automated identification, retrieval, and installation of updated codecs for video components. The system utilizes a script file and information furnished by a user to perform updates. The script file maintains information on current version numbers for the software components. The script file is downloaded from a codec service provider. The script contains a sequence of requests and responses intended to simulate the entry of data into forms via a browser. The script file is not an update database record for an application, and cannot be run to create an update database record.

U.S. Pat. No. 7,913,246 discloses a system and method for updating a software program. According to this system, a catalog of updates is downloaded from an update server and the server determines which updates need to be applied to particular systems. The system disclosed does not create or generate application update database records that are used to determine if an update or version should be applied to a computer. Rather, the disclosed system permits the update server to determine necessary updates.

As opposed to the previous update computer systems disclosed above, the computer-readable medium, computer system and data structure component aspects disclosed herein provide a technological improvement of generating update database records by executing custom programs pulling data from unordered data sources, and the generated update database record is configured and structured to be used to update applications on customer-computer systems.

Figure 1:
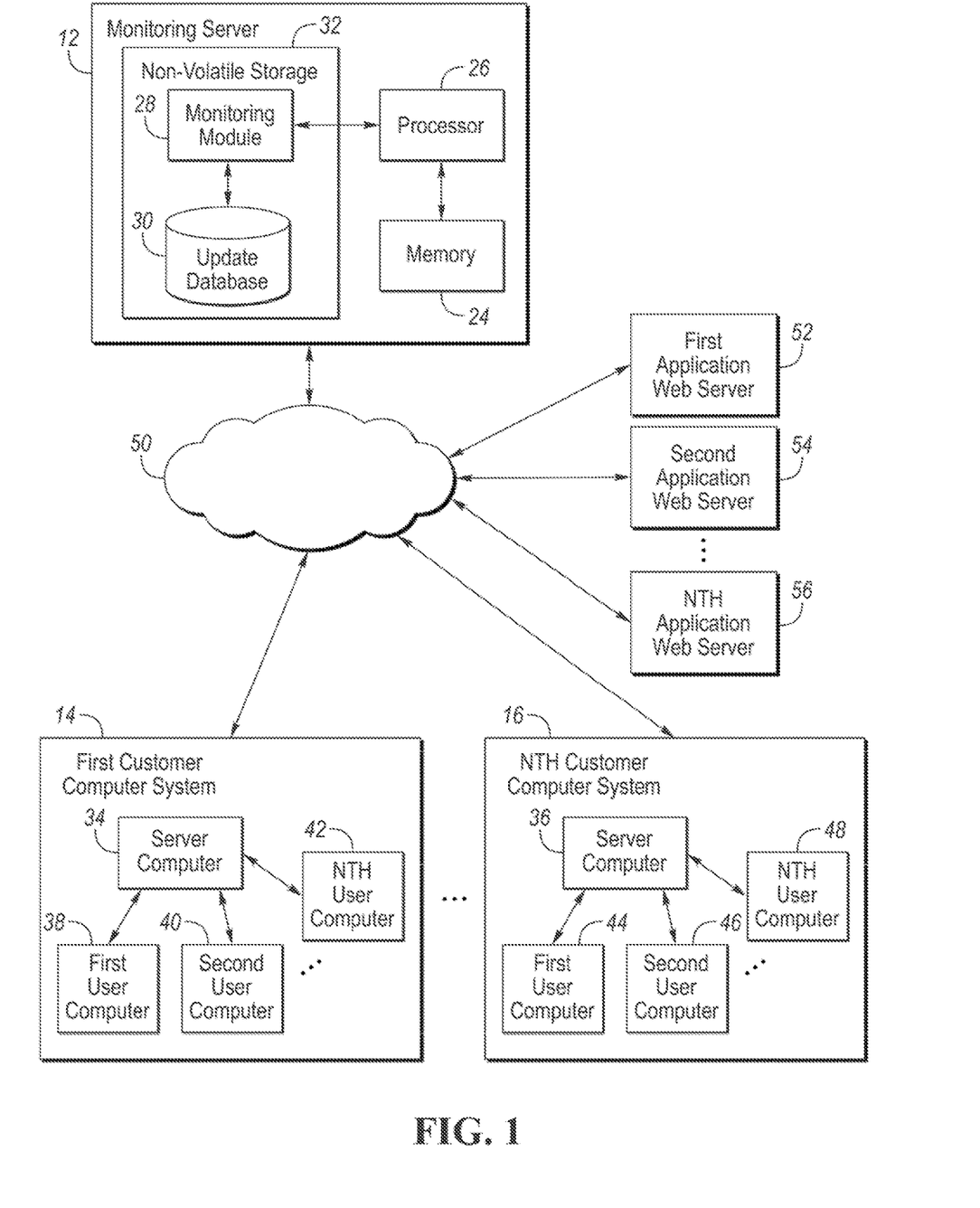
FIG. 1 is an example computer system for implementing an application monitoring system.

Example aspects operate in a computing environment having a monitoring server that communicates with other servers through a distributed network. FIG. 1 depicts an example network computer system architecture including different computing environments, including an update monitoring computer environment, customer computing environments and application computing environments. Computer system 10 includes monitoring server 12, first customer computer system 14, nth customer computer system 16, first application web server 18, second application web server 20, and nth application web server 22.

Monitoring server 12 is configured to monitor the Internet for updates to applications by executing update programs to search for and collect data regarding updates. An update may be an update, fix, patch or modification to an application that is configured to fix application features or functionality that are not working as intended or to add or modify relatively minor enhancement and compatibility features to the application. An application may be any program or plurality of programs configured for use by an end user or other user. Non-limiting examples of applications include system software, such as file management tools, operating systems, utilities, assemblers, debuggers, and compilers, and application software, such as word processing, spreadsheets, graphics, games, communications, and databases. An update program may refer to a set of instructions, or a set of modules or procedures, that allow for the operations of searching for and collecting data regarding updates. An update program can be written in any number programming languages, such as Visual Basic, Python, Java, C, C++, C#, Objective C, Fortran, Pascal, Java Script, Perl, and PL/SQL. An update program may be executed as a script, source code or object code.

Monitoring server 12 may include memory 24, processor 26, and non-volatile storage 32. Monitoring module 28 and update database 30 are stored in non-volatile storage 32. The processor 26 may include one or more computing device selected from microprocessors, micro-controllers, digital signal processors, microcomputers, central processing units, field programmable gate arrays, programmable logic devices, state machines, logic circuits, analog circuits, digital circuits, or any other computing devices that manipulate signals (analog or digital) based on computer-executable instructions residing memory 24. Memory 24 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. Non-volatile storage 32 may include one or more persistent data storage devices such as a hard drive, optical drive, tape drive, non-volatile solid state device, cloud storage or any other device capable of persistently storing information.

The processor 26 may be configured to read into memory 24 and execute computer-executable instructions residing in monitoring module 28 (e.g., update programs) of non-volatile storage 32 and embodying the custom update logic and/or methodologies of one or more embodiments. The processor 26 may be further configured to read into memory 24 and execute computer-executable instructions residing in monitoring module 28 (e.g., update programs) of non-volatile storage 32 to write data to update records residing in update database 30. The monitoring module 28 (e.g., update programs) may be complied or interpreted from computer programs created using a variety of programming languages and/or technologies.

The update database 30 may also include instructions that, when loaded into memory and executed by processor 26 cause update database 30 to perform database functionality including the storage, update, and retrieval of relational information. Databases or data repositories such as update database 30 may include various kinds of mechanisms for storing, accessing, and retrieving various kinds of data, including a hierarchical database, a set of files in a file system, an application database in a proprietary format, a relational database management system (RDBMS) (e.g., a Microsoft SQL Server), etc. Update database 30 may employ features of the computer operating system of monitoring server 12. Update database 30 may also utilize the file system via the computer operating system, and may store and retrieve files stored in various formats. An RDBMS generally employs a Structured Query Language (SQL) in addition to a language for creating, storing, editing, and executing stored procedures. In one embodiment, update database 30 may be configured to maintain update records containing information collected from unordered data sources.

The program code embodying the update logic and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage medium may further include RAM, ROM, erasable programmable read-only memory (EPROM), electrically erasable programmable read-only memory (EEPROM), flask memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

Monitoring server 12 is in communication with first customer computer system 14 and nth customer computer system 16 through external network 50. External network 50 may be a plurality of interconnected networks using standardized protocols, such as the Internet. While FIG. 1 depicts two customer computer systems, computer system 10 is scalable to have more than two customer computer systems such that there could be 10, 100, 1,000 or more customer computer systems, for example. Each customer computer system 14 and 16 includes a respective server computer 34 and 36. While FIG. 1 depicts one server computer per customer computer system, each customer computer system is scalable to have two or more servers such that there could be 10, 100, 1,000 or more servers, for example. First customer computer system 14 also includes first user computer 38, second user computer 40 and nth user computer 42. Nth customer computer system 16 includes first user computer 44, second user computer 46 and nth user computer 48. While FIG. 1 depicts that each customer computer system includes three user computers, each customer computer system is scalable such that there could be 10, 100, 1,000, 10,000 or even more customer user computers, for example.

Figure 2:
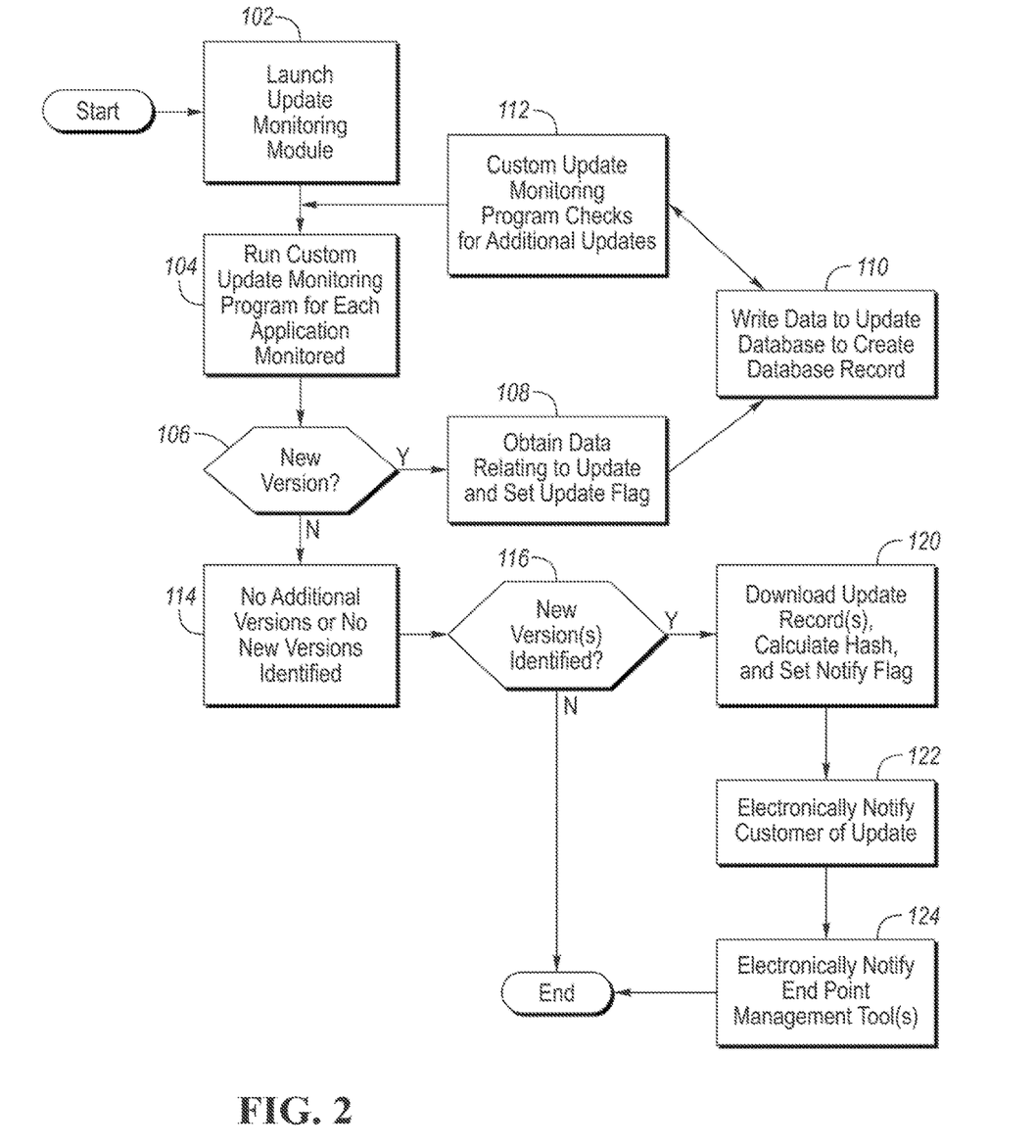
FIG. 2 is an example process for automatically monitoring application updates.

FIG. 2 illustrates an example process 100 that can be implemented on computer system 10 for automatically monitoring application updates. The process 100 may be embodied in computer readable instructions that are stored on monitoring module 28 and executable by processor 26 of monitoring server 12.

At operation 102, monitoring module 28 is launched by processor 26 of monitoring server 12. Monitoring module 28 may be launched by a user, such as a monitoring system operator. Alternatively, monitoring module 28 may be launched automatically at periodic time intervals, established by the monitoring system operation or other user. For example, the periodic time interval may be any of the following, hourly, daily, every other day, weekly and monthly. Once monitoring module 28 is launched, the frequency of executing the monitoring of updates may be varied depending on the application. For instance, some applications may require more frequent monitoring because those applications have more frequent updates than other applications.

Figure 3:
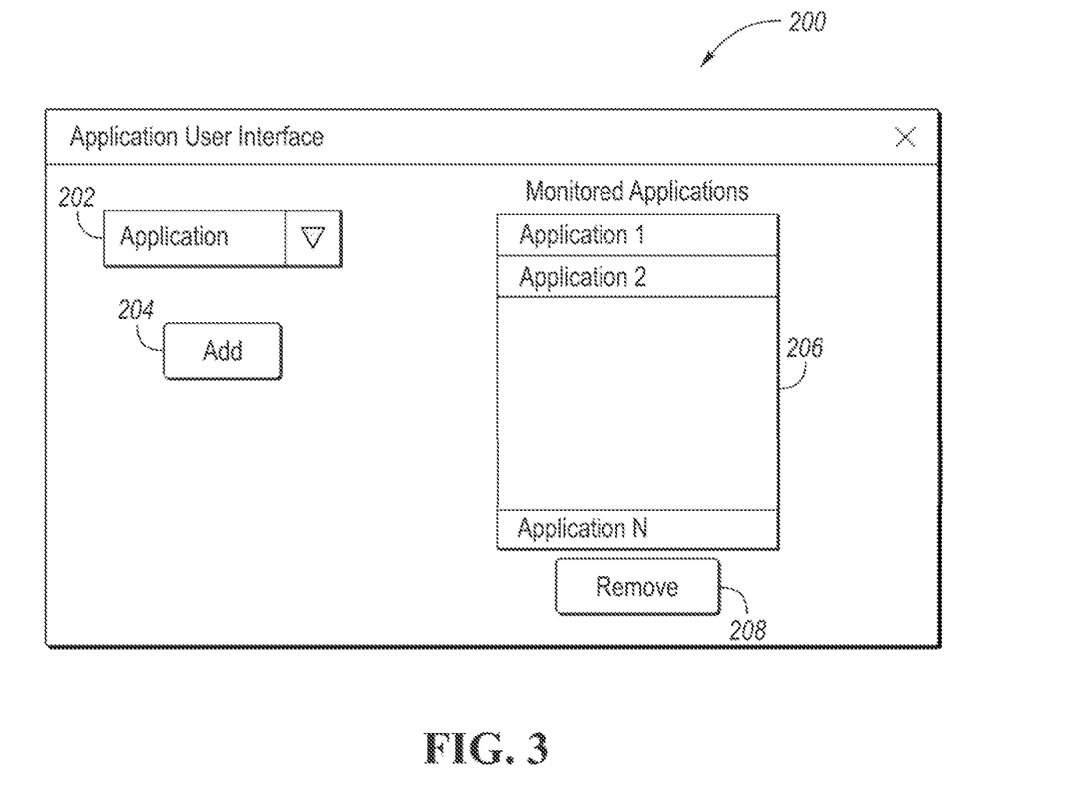
FIG. 3 is an example user interface for a customer to interface with the application monitoring computer system of FIG. 1.

At operation 104, monitoring module 28 executes a custom update monitoring program for each application monitored. Each application monitored may be selected by a system administrator of each customer computer system 14 and 16. FIG. 3 depicts user interface 200 for the selection of applications to be monitored by monitoring module 28. User interface 200 includes application drop down box 202 that includes a list of available applications for update monitoring. The list of available applications may include all applications in which custom programs exist within monitoring module 28 to monitor for updates. A user (e.g., a system operator of monitoring server 12 or a system administrator for first customer computer system 14 or nth customer computer system 16) can click on application drop down box 202 to activate and display a partial or entire list of available applications, depending on the number of applications. A user can then scroll through the list of available applications and select an application. When the application is selected, it can then be added to a list of monitored applications by selecting add control 204. By adding the application, it is saved to update database 30 into a list of selected applications for monitoring. As shown in FIG. 3, user interface 200 also includes application display window 206 that is configured to display the list of monitored applications. Application display window 206 is scrollable if there are more monitored applications than rows available in application display window 206. A user can select one or more applications within application display window 206 and remove the selected applications from the list of monitored applications by selecting or clicking remove control 208. This operation removes the selected applications from the list of monitored applications shown in application display window 206 and the list of monitored applications stored in update database 30.

At operation 104, monitoring module 28 is configured to execute a custom update monitoring program for each application on a list of monitored applications. A first update monitoring program is customized to interface and collect update data, metadata and/or information from first application web server 52 associated with a first application. A second update monitoring program is customized to interface and collect update data, metadata and/or information from second application web server 52 associated with a second application. The first customizations associated with the first update monitoring program may differ from the second customizations associated with the second update monitoring program.

Figure 4:
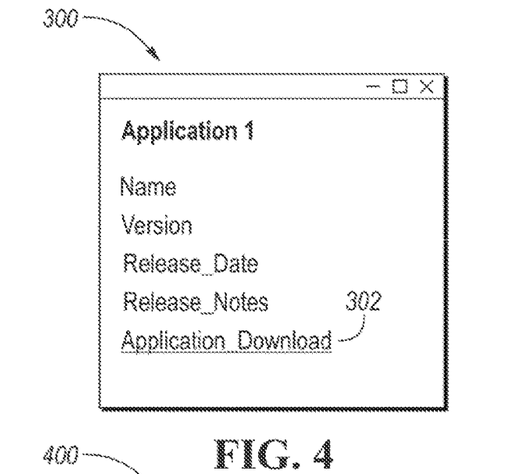
FIG. 4 is an example webpage for a first application compatible with the automated application monitoring computer system of FIG. 1.

FIG. 4 depicts landing page 300 for a first application hosted on first application web server 50. Landing page 300 includes the Name, Version, Release_Date and Release-_Notes for the first application. This data may be presented as text on landing page 300 that is generated by first application web server 52 from html and/or other source files. Landing page 300 also includes Application_Download hyperlink 302. Upon activation of Application_Download hyperlink 302, first application web server 52 may initiate a download sequence to download data and/or programs associated with downloading an update or new version of the first application. In another embodiment, upon activation of Application_Download hyperlink 302, first application web server 50 may open a different web page with instructions on how to download the update or new version of the first application.

In one embodiment, the first update monitoring program is customized to interface with landing page 300 and other webpages associated with the first application web server 50 to collect data, metadata and/or information associated with an update of the first application. In one or more embodiments, the customized first update monitoring program is configured to identify the location (e.g., webpage, webpage hierarchy or placement on a webpage) and format (e.g., text, html source, etc.) of classes and members of update data on landing page 300 and/or other webpage associated with the first application web server 50.

Update data classes may include application data, application_version data, application_download data, application_installation data, application_uninstallation data and vendor data. Each update data class may include one or more data members. Non-limiting examples of data members in the application data class may include ID, name and current_version. Non-limiting examples of data members in the application_version data class may include ID, release_date, release_notes and release_notes URL. Non-limiting examples of data members in the application_download data class may include MD5, name, SHA1, SHA256, size, type and uniform resource locator (URL). MD5 is a message-digest algorithm including a hash function that produces a 128-bit hash value. SHA1 is a message-digest algorithm including a hash function that produces a 160-bit hash value. SHA256 is a message-digest algorithm including a hash function that produces a 256-bit hash value. Non-limiting examples of data members in the application_installation data class may include global unique identifier (GUID), syntax data and verified data. The GUID may refer to a unique 128-bit number that is produced by a Windows application (e.g., Windows OS) to identify a particular component or application. The syntax data may refer to silent command line installation parameters (e.g., command line switches). The verified data may refer to the application going through silent installation testing by an automated process or testing operator, which has been verified as an accurate command line installation. Non-limiting examples of data members in the application_uninstallation data class may include syntax and verified. Non-limiting examples of data members in the vendor data class may include ID and name.

Figures 5A, 5B:
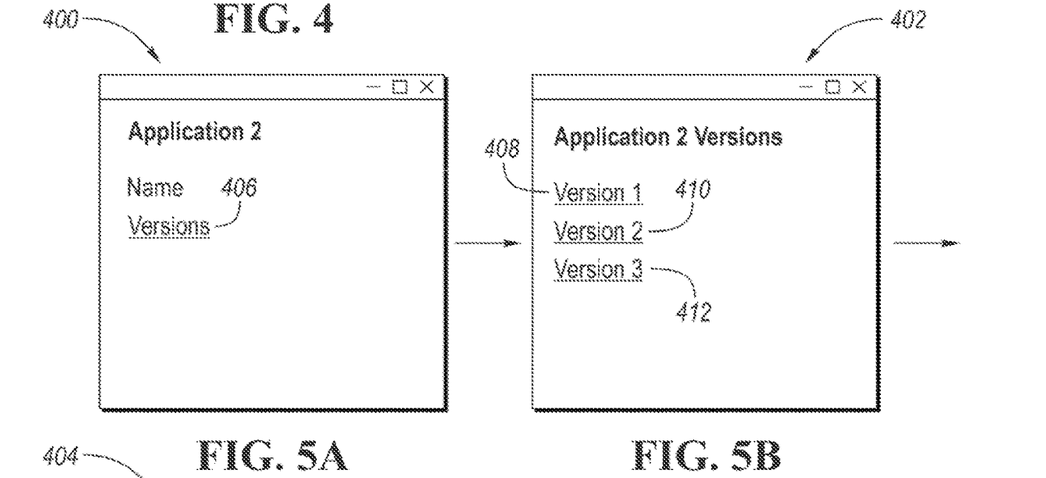
FIGS. 5A, 5B and 5C are example webpages for a second application compatible with the application monitoring computer system of FIG. 1.
Figure 5C:
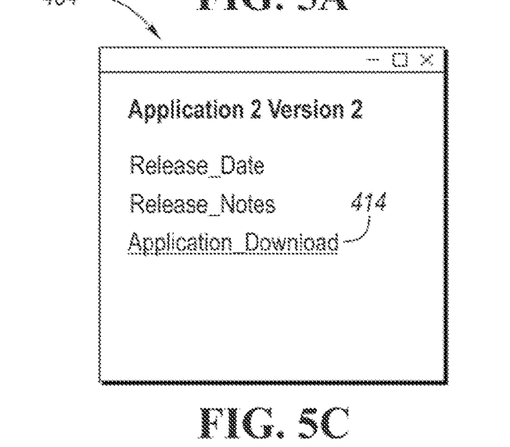

FIGS. 5A, 5B and 5C depict landing page 400, versions webpage 402, and version two webpage 404, respectively, for a second application hosted on second application web server 54. Landing page 400 includes the Name of the first application and is presented as text on landing page 400 that is generated by first application web server 52 from html or other source files. Landing page 400 also includes Versions hyperlink 406. Upon activation of Versions hyperlink 406, second application web server 54 may serve versions webpage 402 for display through a web browser. Webpage 402 includes Version 1 hyperlink 408, Version 2 hyperlink 410 and Version 3 hyperlink 412. Upon activation of Version 1 hyperlink 408, second application web server 52 may serve a webpage specific to version 1 for display through a web browser. Upon activation of Version 2 hyperlink 410, second application web server 54 may serve a webpage specific to version 2 for display through a web browser. Version two webpage 404 is an example of a webpage specific to version 2. Upon activation of Version 3 hyperlink 412, second application web server 54 may serve a webpage specific to version 3 for display through a web browser. Version two website 404 includes the Release_Date and Release_Notes for version 2 for the second application. This data may be presented as text on version two website 404 that is generated by second application web server 54 from html and/or other source files. Version two website 404 also includes Application_Download hyperlink 414. Upon activation of Application_Download hyperlink 414, second application web server 54 may initiate a download sequence to download data and/or programs associated with downloading version two of the second application. In another embodiment, upon activation of Application_Download hyperlink 414, second application web server 52 may open a different web page with instructions on how to download version two of the second application.

In one embodiment, the second update monitoring program is customized to interface with landing page 400, versions webpage 402, version two webpage 404 and other webpages associated with the first application web server 54 to collected data and information associated with an update to the second application. In one or more embodiments, the customized second update monitoring program is configured to identify the location (e.g., webpage, webpage hierarchy, or placement on a webpage) and format (e.g., text, html source, etc.) of classes and members of update data on landing page 400, versions webpage 402, version two webpage 404 and other webpages associated with the second application web server 52. As shown in FIGS. 4, 5A, 5B and 5C, the location and/or formats of classes and members of update data are different between first and second application updates. One or more embodiments accommodate these differences through customization of the custom update monitoring programs for each of the applications and their updates.

Monitoring module 28 stores custom update monitoring programs for each application in the list of available applications. Each custom update monitoring program obtains update data and compares the update data with the existing update data in the update database 30 for a customer. In this way, the custom update monitoring program determines if a new version exists (e.g., a new version relative to the version installed by the customer) is available, as shown in operation 106 of process 100. In one embodiment, a customer may execute the update monitoring program against the customer computer system to determine if a new version exists. In another embodiment, the custom update monitoring program stores each version found on the application update website in the update database 30 and determines that a new version exists if it is present on the application update website but not in the update database 30. In one embodiment, the update data obtained is only enough to determine if a new version exists. This data may only include application_version data, such as ID, release_date, release_notes and release_notes URL. In this way, process 100 may be executed efficiently to only identify and collect the data that is necessary to determine the existence of a new version.

If a new version exists, then process 100 obtains additional update data and sets an update flag, as set forth in operation 108. Setting the update flag is utilized later in the process to determine if new version(s) of a software application exist. In operation 108, custom update monitoring program is configured to access an application web server (e.g., web servers 52, 54 and 56) to identify and collect update data members within update data classes (non-limiting examples of which are disclosed herein). Custom update monitoring program is configured to navigate through and within a number of webpages hosted by an application server to collect update data.

Figure 6:
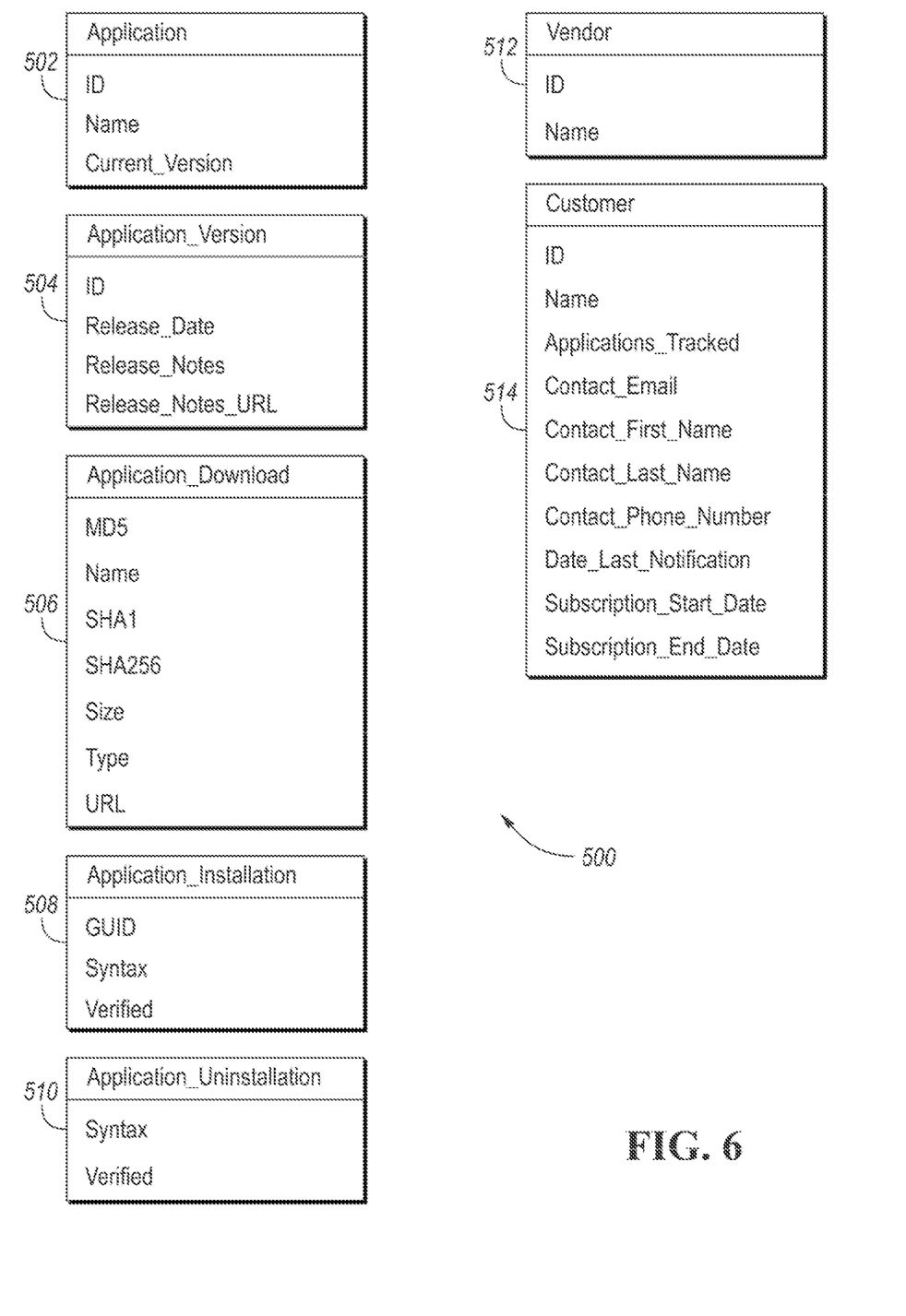
FIG. 6 is an example update database structure for cataloging application update data.

As shown in operation 110, custom update monitoring program is configured to organize the update data into an update database record and write it to update database 30. In so doing, custom update monitoring program obtains update data from multiple sources (e.g., multiple locations on a webpage and/or multiple webpages associated with the application update) and creates an ordered database record. FIG. 6 depicts a database structure 500 having several different data tables including one or more data members associated with application updates according to one embodiment. Database structure 500 includes Application data table 502, Application_Version data table 504, Application_Download data table 506, Application_Installation data table 508, Application_Uninstallation data table 510, Vendor data table 512, and Customer data table 514. Application data table 502 may include the following non-limiting data class members: ID, name and current_version. Current_version may be linked to the current_version of an application installed by a customer. Application_Version data table 504 may include the following non-limiting data class members: ID, release_date, release_notes, and release_notes URL. The Application_Version data may be stored for each application version located by the custom update monitoring program, and can be linked to each customer stored in database structure 500. Application_Download data table 506 may include the following non-limiting data class members: MD5, name, SHA1, SHA256, size, type and URL. Application_Installation data table 508 may include the following non-limiting data class members: GUID, syntax and verified. Application_Uninstallation data table 510 may include the following non-limiting data class members: syntax and verified. Vendor data table 512 may include the following non-limiting data class members: ID and name. Vender data table 512 may be linked to Application data tables 502 through 510. Customer data table 514 may include the following non-limiting data class members: ID, name, applications tracked, contact email, contact first name, contact last name, contact_phone_number, date_last_notification, subscription start date and subscription_end_date. The customer data table 514 may be linked to each of the Applicant data tables 500 through 510 so that the update monitoring program can be executed on a customer by customer basis. In one embodiment, the update monitoring program is configured to take unordered data from one or more webpages and/or locations of webpages and create update records that are ordered by update data classes and members.

As shown by operation 112, when update monitoring module 28 is finished writing data to update database to create an update record, the custom update monitoring application is configured to check for additional updates for the application being monitored. As such, operation 104 is executed again. If another new version of the application exists, then operations 108, 110 and 112 are executed again. If no new versions, or no new additional versions are identified, then the loop of operations 108, 110 and 112 is concluded, as shown in operation 114.

In operation 116, monitoring module 28 determines if any new versions of the application have been identified in operations 102 through 112 of process 102. If no new versions of an application have been identified, then the process ends, as shown in operation 118. If new version(s) of the application have been identified, then an update record for each new version is downloaded from update database 30 into memory 24, as depicted in operation 120. Operation 120 also includes performing a hash of each update record to assure integrity of the update data in the update record. Also, operation 120 includes setting a flag in update database 30 to show that the update record has been downloaded.

Operation 120 is followed by operation 122. Operation 122 includes electronically notifying the customer associated with the application of the new version(s). The electronic notification may be executed by monitoring module 28 transmitting an e-mail to a customer's email address. The content of the email may include update data from the update record for the new version. This data may include any of the update application member data identified above. In other embodiments, the notification could be an SMS text. The notification may also include a link to trigger the display of a user interface displaying information and data about the update.

In operation 124, monitoring module 28 is configured to electronically notify one or more end point management tools of one or more updates (e.g., new versions) of monitored software. Non-limiting examples of end point management tools include Altiris, BigFix, Microsoft System Center Configuration Manager (SCCM), and LANDesk. The transmitted information may be utilized by the end point management system to install the one or more updates (e.g., one or more new versions) on user computers of a customer computer system.

Figure 7:
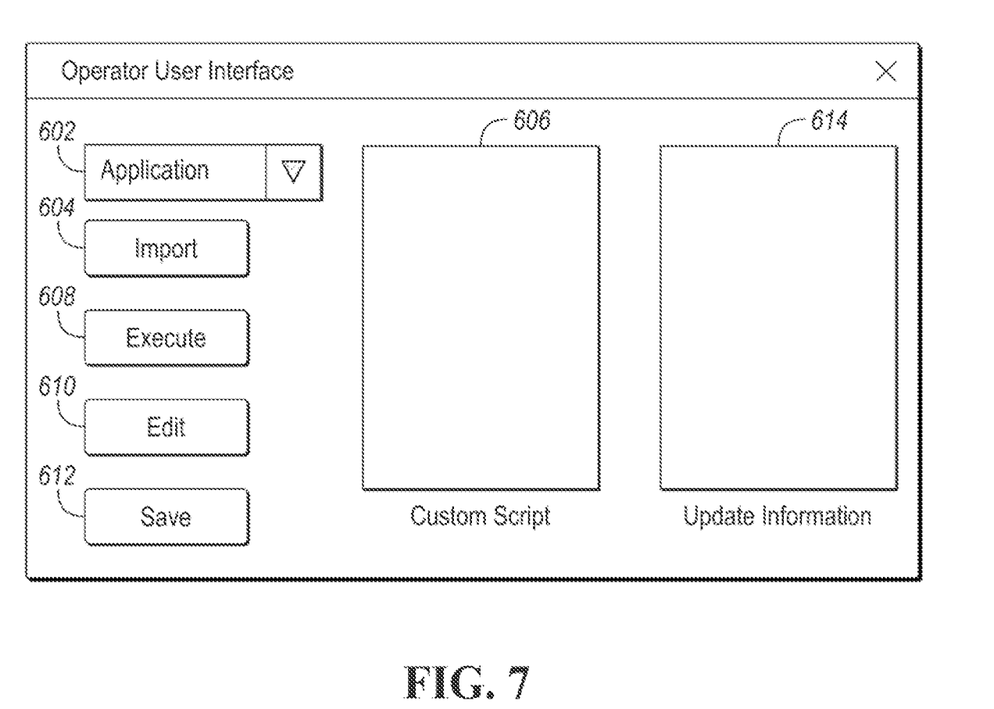
FIG. 7 is an example user interface for a system operator to interface with the automated application monitoring system of FIG. 1.

FIG. 7 is a user interface 600 configured to provide functionality to a system operator of monitoring server 28. Unser interface 600 includes application drop down box 602 that includes a list of available applications for update monitoring. The list of available applications may include all applications in which custom programs exist within monitoring module 28 to monitor for updates. A system operator of monitoring server 28 can click on application drop down box 602 to activate and display a partial or entire list of available applications, depending on the number of applications. The system operator can then scroll through the list of available applications and select an application. When the application is selected, the system operator may import the custom update monitoring program into the environment of user interface 700 by selecting import control 604. As shown in FIG. 7, the custom update monitoring program is a custom update monitoring script. When import control 604 is selected, then the custom script is displayed within custom script window 606 for review by system operator. User interface 600 also includes execute control 608 and edit control 610. When execute control 608 is selected, monitoring module 28 is configured to execute the custom script displayed within custom script window 606. After the custom script is executed, the output of execution of the custom script is displayed as update information in update information display window 614. The update information may include new version information and application information. When edit control 610 is selected, monitoring module 28 is configured to make custom script window 606 activated to be edited. Save control 612 can be selected to save edits made to the custom script through custom script window 606.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer system for monitoring application updates, the computer system comprises:
a computer having non-transitory memory for storing machine instructions that are to be executed by the computer, the machine instructions when executed by the computer implement the following functions:
access a first application server of a first application to obtain first application update data on a first application website served by the first application server, the first application update data including first application data and first application version update data, the first application data and the first application version update data being structured on the first application website in a first format, a first number of locations, and/or a first webpage hierarchy;
access a second application server of a second application to obtain second application update data on a first application website served by the second application server, the second application update data including second application data and second application version update data, the second application data and the second application version update data being structured on the first application website in a second format, a second number of locations, and/or a second webpage hierarchy, at least one of the first format, the first number of locations, and the first webpage hierarchy is different than at least one of the second format, the second number of locations, and the second webpage hierarchy;
generating a first update database record including the first application update data, the first update database record structured differently than the first format, the first number of locations, and/or the first webpage hierarchy; and
generating a second update database record including the second application update data, the second update database record structured differently than the second format, the second number of locations, and/or the second webpage hierarchy.

2. The computer system of claim 1, wherein the first update database record includes first application update data in a first class and a second class.

3. The computer system of claim 2, wherein the first class is an application version class and the second class is an application download class.

4. The computer system of claim 1, wherein the machine instructions when executed by the computer implement the further function: transmitting an electronic notification with at least a portion of the first application update data.

5. The computer system of claim 1, wherein the machine instructions when executed by the computer implement the further function: transmitting the first and second update database records to an endpoint management tool.

6. The computer system of claim 1, wherein the machine instructions when executed by the computer implement the further function: downloading the first and second update database records to an endpoint management tool and performing a first hash on the first update database record and a second hash on the second update database record.

7. The computer system of claim 1, wherein the first and second applications are different than each other.

8. A computer readable medium comprising:
non-transitory memory for storing machine instructions that are to be executed by a computer, the machine instructions when executed by the computer implement the following functions:
access a first application server of a first application to obtain first application update data on a first application website served by the first application server, the first application update data including first application data and first application version update data, the first application data and the first application version update data being structured on the first application website in a first format, a first number of locations, and/or a first webpage hierarchy;
access a second application server of a second application to obtain second application update data on a first application website served by the second application server, the second application update data including second application data and second application version update data, the second application data and the second application version update data being structured on the first application website in a second format, a second number of locations, and/or a second webpage hierarchy, at least one of the first format, the first number of locations, and the first webpage hierarchy is different than at least one of the second format, the second number of locations, and the second webpage hierarchy;
generating a first update database record including the first application update data, the first update database record structured differently than the first format, the first number of locations, and/or the first webpage hierarchy; and
generating a second update database record including the second application update data, the second update database record structured differently than the second format, the second number of locations, and/or the second webpage hierarchy.

9. The computer readable medium of claim 8, wherein the first update database record includes first application update data in a first class and a second class.

10. The computer readable medium of claim 9, wherein the first class is an application version class and the second class is an application download class.

11. The computer readable medium of claim 8, wherein the machine instructions when executed by the computer implement the further function: transmitting an electronic notification with at least a portion of the first application update data.

12. The computer readable medium of claim 8, wherein the machine instructions when executed by the computer implement the further function: transmitting the first and second update database records to an endpoint management tool.

13. The computer readable medium of claim 8, wherein the machine instructions when executed by the computer implement the further function: downloading the first and second update database records to an endpoint management tool and performing a first hash on the first update database record and a second hash on the second update database record.

14. A method for monitoring application updates, the method comprising:
accessing a first application server of a first application to obtain first application update data on a first application website served by the first application server, the first application update data including first application data and first application version update data, the first application data and the first application version update data being structured on the first application website in a first format, a first number of locations, and/or a first webpage hierarchy;
accessing a second application server of a second application to obtain second application update data on a first application website served by the second application server, the second application update data including second application data and second application version update data, the second application data and the second application version update data being structured on the first application website in a second format, a second number of locations, and/or a second webpage hierarchy, at least one of the first format, the first number of locations, and the first webpage hierarchy is different than at least one of the second format, the second number of locations, and the second webpage hierarchy;
generating a first update database record including the first application update data, the first update database record structured differently than the first format, the first number of locations, and/or the first webpage hierarchy; and
generating a second update database record including the second application update data, the second update database record structured differently than the second format, the second number of locations, and/or the second webpage hierarchy.

15. The method of claim 14, wherein the first update database record includes first application update data in a first class and a second class.

16. The method of claim 15, wherein the first class is an application version class and the second class is an application download class.

17. The method of claim 14 further comprising transmitting an electronic notification with at least a portion of the first application update data.

18. The method of claim 14, further comprising transmitting the first and second update database records to an endpoint management tool.

19. The method of claim 14, further comprising downloading the first and second update database records to an endpoint management tool and performing a first hash on the first update database record and a second hash on the second update database record.

20. The method of claim 14, wherein the first and second applications are different than each other.

* * * * *

UNITED STATES PATENT AND TRADEMARK OFFICE
CERTIFICATE OF CORRECTION

| | |
|---|---|
| PATENT NO. | : 11,281,444 B2 |
| APPLICATION NO. | : 16/453644 |
| DATED | : March 22, 2022 |
| INVENTOR(S) | : David Mamikonyan et al. |

It is certified that error appears in the above-identified patent and that said Letters Patent is hereby corrected as shown below:

On the Title Page

Item (73) Delete:
"(73) Assignees: Creative Breakthrough Inc., Detroit MI (US); David Mamikonyan, Holland PA (US)"

And insert:
--(73) Assignees: Creative Breakthroughs, Inc., Detroit MI (US); David Mamikonyan, Holland PA (US)--

Signed and Sealed this
Second Day of August, 2022

Katherine Kelly Vidal
*Director of the United States Patent and Trademark Office*